Sept. 15, 1959  S. F. SACHACZENSKI  2,903,799
DRYING APPARATUS
Filed June 21, 1955
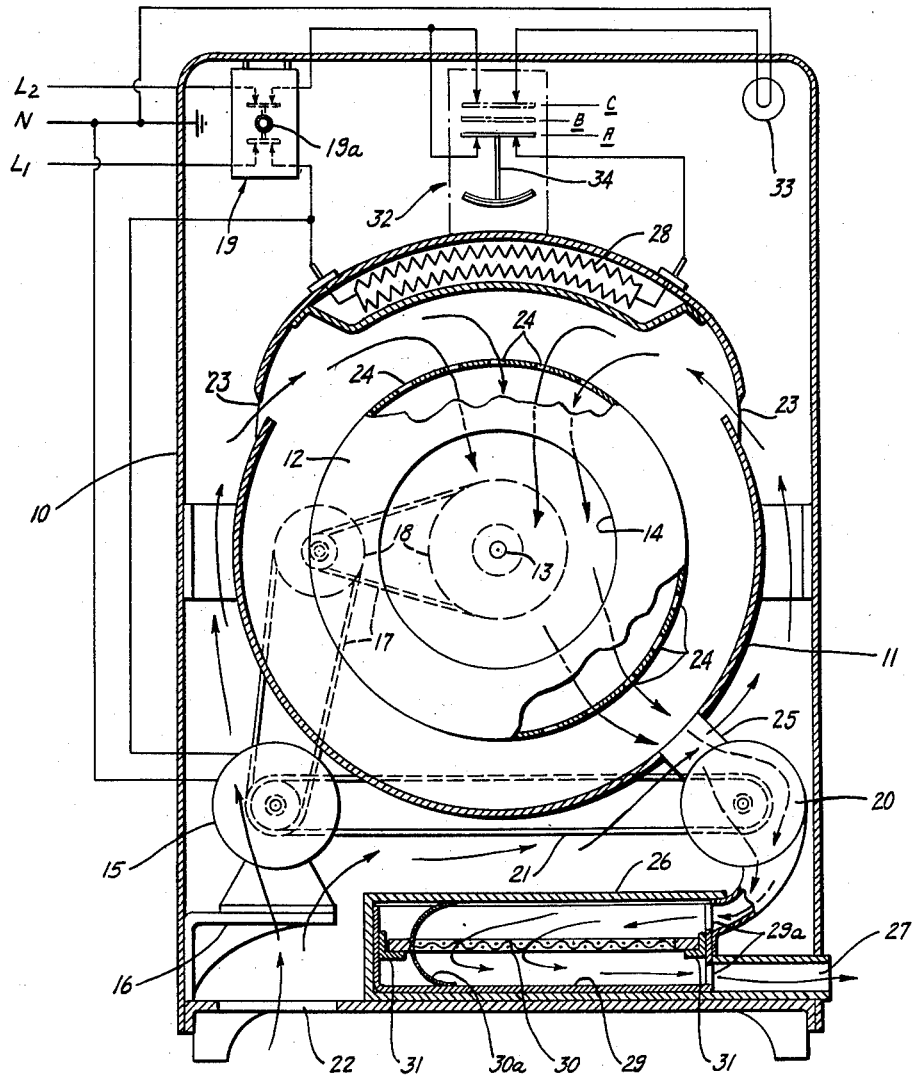
INVENTOR.
STANLEY F. SACHACZENSKI
BY Carl H. Synnestvedt
AGENT ical 2,903,799
Patented Sept. 15, 1959

2,903,799

DRYING APPARATUS

Stanley F. Sachaczenski, Norristown, Pa., assignor to Philco Corporation, Philadelphia, Pa., a corporation of Pennsylvania Application June 21, 1955, Serial No. 516,975

2 Claims. (Cl. 34—45)

The invention herein disclosed and claimed relates generally to drying apparatus and is directed particularly to clothes driers of the kind which are devised especially, although not exclusively, for home usage.

In domestic driers of the above-mentioned variety, it is common practice to mount a screen in the passage which leads to the outside of the drier casing, in order to trap lint from the drying air which discharges through said passage. Because such a screen is apt to become clogged with accumulated lint, and because a clogged trap reduces the effectiveness of the drier and gives rise to fire hazards, it is required that the trap be inspected frequently and, in fact, should be inspected after each use. For safety reasons, it has been the custom to construct the lint trap so that lint-laden air can by-pass the screen in the event it should become covered with an excessive accumulation of lint. However, a trap constructed in this manner has the disadvantage that when lint-laden air is allowed to by-pass the trapping screen, lint is discharged into the room and thus becomes a source of annoyance and complaint.

It is, therefore, an object of the present invention to provide a clothes drier having means which overcomes the above-noted objections and still assures safety in the use of the drier.

It is also an object of the invention to provide a clothes drier in which a lint trap is constructed and arranged in such a manner that lint is positively prevented from being blown out of the drier and into the room, and in which a novel arrangement minimizes the hazards and detrimental consequences of excess lint accumulation.

Another and more specific object of the invention has to do with the provision of a clothes drier incorporating an improved and new association of means for warding off potential dangers of excess accumulation of lint, and for indicating such accumulation.

A characteristic feature of the invention resides in the provision of a clothes drier wherein a change which occurs in the operative condition of the drier when the lint trap begins to clog with accumulated lint, is utilized to indicate the improper state of the lint trap, before accumulation of lint becomes dangerous.

Broadly stated and in accordance with the present invention, the above-noted objects and novel features are achieved by utilization of a drier having a drying enclosure associated with a heater and with air-circulating means for effecting flow of air into and out of said enclosure. Delinting means is arranged in the air-circulating means and includes a lint trap for removing lint entrained in heated moist air flowing out of the drying enclosure. This delinting means is such that the heated moist air is normally discharged through the trap, and that undue clogging of said trap by accumulated lint brings about a condition preventing said normal discharge of air and consequently impeding the flow of air through the drier. This condition causes the temperature of the drying enclosure to rise rapidly because of the lack of circulated air in sufficient quantity to pick up and carry heat away from said enclosure. This temperature rise is sensed by a device operable upon occurrence of said condition, to protect and to warn against excessive accumulation of lint.

According to a specific embodiment of the invention, the above-mentioned sensing device includes temperature-responsive or thermostatic means electrically connected with the heater so that the latter is deenergized upon occurrence of the change in the temperature of the drying enclosure due to accumulation of lint. Also in accordance with the invention, signalling means is included in the electrical circuit of said means and serves to indicate the necessity of cleaning the trap of accumulated lint.

The full nature of the invention and the manner in which the mentioned and other objects and features are realized will be more fully understood from the following description taken in conjunction with the accompanying drawing, the single view of which diagrammatically illustrates, partly in section and partly in elevation, one form of clothes drier incorporating a preferred embodiment of the invention.

With more particular reference to the drawing, the essential elements of a clothes drier as shown include an outer cabinet structure 10 which contains a drying enclosure 11 constructed of material having high heat conductivity, such as aluminum. This enclosure is configured to house a clothes receptacle 12 in the form of a perforated drum mounted to rotate about a generally horizontal central axis 13. The drum has an open front 14 through which clothes may be placed into and removed, and this open front of the drum confronts the conventional sealing door (not shown) which is usually hinged onto the drier casing.

An electric motor 15 is conveniently mounted within the casing 10 by means of a suitable bracket 16 and rotatably drives the drum at reduced speed through the intermediary of belts 17 and pulleys 18, or other suitable known speed-reducing systems. The operation of the motor may be controlled in the customary fashion by means of a conventional timer and switch mechanism 19 including a manually operable setting knob 19a.

Air-circulating means including a blower 20 driven by the motor 15 through a belt 21, or like connection, effects a flow of air through the drier. As represented by arrows in the drawing, air is admitted into the interior of the drier casing 10 through inlet means 22 and enters the drying enclosure 11 through intake passages 23 advantageously provided in opposite upperside portions of said enclosure. Air circulated within said enclosure passes into and out of the drum through its perforations 24 and, thus, flows in contact with the clothes as they tumble in said drum. From the drying enclosure, air passes out through an outflow passage 25 opening out of a lower part of said enclosure and communicating with the inlet side of the blower 20, the outlet side of which communicates with a discharge duct 26 leading to a venting passageway 27 for exhausting the air from the inside to the outside of the drier casing.

A heater 28 of suitable type is provided to heat the interior of the drier and the air therein. As represented in the drawing, the heater is of the electric resistance type and is conveniently arranged in intimate heat exchange association with the drying enclosure to maintain the same at elevated temperature so that air circulated about as well as within said enclosure is subjected to heat which is conducted throughout the wall structure of said enclosure. The heater is advantageously located at an upper part of the drying enclosure adjacent the intake passages 23 thereof to insure that the temperature in the region where air enters said enclosure, is at the highest level so that air in the immediate vicinity of said region is subjected to increased heating effect directly before and after entering said enclosure. The heated air passing through the drum in the manner above described, picks up and carries away moisture from the clothes and produces a drying effect thereon. Lint which forms in the clothes-drying process is also carried away or entrained in the air passing out of said enclosure.

In order to prevent the escape of lint through the venting passageway 27, there is provided a delinting arrangement or trap unit which, in the illustrated embodiment, includes a drawer-like member 29 and lint-trapping means in the convenient form of a screen 30. The member 29 removably occupies the duct 26 and has one of its sides open, as by means of ports 29a, to communicate with the outlet of the blower 20 and with the venting passageway 27. The screen 30 is carried by said member and is arranged in the path of movement of the air flowing in and out of said duct through said ports. It will be apparent that a lint-trapping screen arranged in this manner would ordinarily have the hereinbefore noted undesirable features requiring frequent inspection of the trap to insure against undue accumulation of lint within the trap.

However, in particular accordance with the invention, the lint-trapping screen is deliberately, but purposefully, so arranged, and means is provided for advantageous utilization of a modified condition created within the drier during its operation when the flow of air is impeded due to accumulation of lint on said trapping screen. In this manner, features which have heretofore been considered objectionable are converted to useful purposes, namely to provide protection against injurious and dangerous effects of lint accumulation, and at the same time to give warning to the user of the existence of a detrimental and potentially dangerous state of the trap, thus making inspection of the trap unnecessary until the user is so warned.

As seen in the drawing, the lint-trapping screen is so constructed and occupies such a position between the outlet of the blower 20 and the venting passageway 27, that all the lint-laden heated air flowing into the duct 26 from said outlet must pass though said screen before the air can flow out through said venting passage. As shown in the drawing and in accordance with the invention, the lint-trapping screen is advantageously associated with an imperforate shield 30a which is curved and so disposed that the air in its course from the blower 20 to the venting passageway 27, is positively deflected to flow through said screen.

Lint entrained in the air is intercepted in the trap and settles on the screen 30, and suitable supporting members 31 conveniently mount said screen so that when cleaning of the trap is required, said screen may be readily lifted out of the trap unit 29, upon removing the latter from the drier. In practice, the trap unit is removed from and returned to its operative position through the front of the drier casing; a suitable cover, door, or like closure means (not shown) being provided to seal the opening giving access to said trap unit.

As hereinbefore indicated, in using a drier having a lint trap constructed and disposed in the manner above described, a change in the operating condition of the drier occurs, particularly with respect to the normal flow of air through the drier, in the event lint accumulates and clogs the trapping screen. This change in operating condition takes place because the air being forced by function of the blower 20 cannot by-pass the screen 29, and an excessive accumulation of lint on said screen, in effect, impedes and blocks the flow of air. Due to this resistance to the passage of air, there is created a back-pressure condition within the air-circulating system with the result that the temperature of the drying enclosure 11, particularly in the vicinity of the heater 28, rises rapidly.

According to the invention, the temperature rise resulting from the above-mentioned blocking of the air by accumulation of lint affects a thermostatically controlled switching device designated generally at 32, which is operable to control the energization of the electric heater 28 and also to control the activation of a suitable indicator or signalling device, such as an electric bulb 33 visible from the front of the drier. In the embodiment shown in the drawing, the thermostatically controlled switching device includes a thermostatic switch 34 normally urged to a first operative position represented at A in which said switch closes the heater circuit. The switching device is best arranged for intimate heat exchange relation with the drying enclosure at a location adjacent the heater where a change in the temperature of said enclosure occurs most rapidly. In this manner, the thermostatic switch 34 responds quickly to the aforesaid temperature rise and moves to a second operative position represented at C. In that latter position, the switch opens the heater circuit and closes the circuit of the signalling device or electric bulb 33.

It is general knowledge that in normal operation of a clothes drier, the operating temperature of the drying enclosure remains at a substantially constant level so long as the moisture content of the clothes remains at a relatively high value. This operating temperature of the drying enclosure is sufficient to maintain the temperature of the drying air within a specified range having, for example, a predetermined lower limit of about 210° F. and a predetermined upper limit of about 220° F. However, as the drying process progresses and the moisture content of the clothes reaches a relatively low value, the temperature of the drying enclosure begins to rise and the temperature of the drying air may reach a point considerably above the specified upper limit, where the heat could be injurious to the clothes if the heater were allowed to continue its operation.

With the present invention, this latter eventuality is taken care of by so calibrating the thermostatic switch 34 that it functions to deenergize the heater when the temperature of the drying enclosure rises to a degree which causes the temperature of the drying air to attain the predetermined upper limit, in the given example, 220° F. In other words, in accordance with this invention, the calibration of the thermostatic switch is such that said switch moves from its aforesaid first operative position A to an intermediate and inoperative position designated at B in which said switch opens the heater circuit without closing the circuit of the signalling device or lamp 33. This function of thermostatic switch 34 is possible because with the heater deenergized and in the absence of excess accumulation of lint, the blower 20 effects rapid expulsion of the heated air through the discharge duct 26 and venting passageway 27, with the result that the temperature of the drying enclosure tends to drop so that there is no effect which would bring about a further movement of said switch to displace it to its signal-operating position C. Thus, when the drier operates under normal conditions, the signalling device remains inoperative and the switch device operates simply as a limit thermostat to maintain the temperature of the drying air within the preset range (210° F.–220° F.).

However, when the lint-trapping screen 30 constructed and arranged as hereinabove described blocks the outflow of heated air, said air becomes predominantly static and, because of this prevailing static state of hot air, there is reduced heat transfer from the drying enclosure. As a result, the temperature of said enclosure continues to rise even though the heater be deenergized. It is this additional temperature rise which affects the thermostatic switch 34 and produces the necessary effect for displacement of said switch beyond its inoperative position B and to its second operative position C, thereby energizing the signal device to give definite indication that cleaning of the trap is needed.

In the drawing, the drier is illustrated with a three-wire circuit arrangement to supply 220–230 volts to the electric heater 28 and to supply 110–120 volts to the electric motor 15 and to the electric signal bulb 33. As shown, the heater is connected with the two high voltage lines $L_1$ and $L_2$ through the timer switch control 19 and through the thermostatic switch 34; the motor is connected with a grounded neutral wire N and with one of said lines, namely line $L_1$, through said timer-switch control; and said signal bulb is connected with the other of said lines, namely line $L_2$, through said thermostatic switch. From the diagrammatic representation of the wiring arrangement, it is clear that with the timer-switch control 19 in its operative position, the motor is energized and functions to operate the drum 12 and the blower 20, regardless of the position of the thermostatic switch 34. It is also clear from said representation that when the timer-switch control 19 is moved to its inoperative position to open the two lines $L_1$ and $L_2$ in the customary manner, all functions of the drier are stopped since the electric circuitry to the heater, motor, and signal bulb includes either both or either one or the other of said lines. It will, of course, be understood that, in practice, other electrical components (not shown) such as an incandescent lamp to illuminate the interior of the dried casing, an ozone producing lamp to freshen the air and clothes within the drier, fuses or relays to protect against current surges and overloads and like devices, may be included in the circuitry in the usual manner for convenience and safety in operation.

From the foregoing description, it will be appreciated that the novel arrangement of this invention effectively insures automatic shut-off of the heater of a clothes drier when an abnormal temperature rise occurs within the drying enclosure, and provides for automatic indication of excessive lint accumulation which caused such abnormal temperature rise. It will particularly be recognized that the invention, in its broader aspect, makes it possible to provide a drier with simple control means which serves the dual puropse of maintaining a proper drying temperature range within the drying enclosure and of warning against a faulty condition of operation.

While the drier has been illustrated and described in connector with a three-wire current supply circuit, it will be understood that a customary two-wire circuit for a 110–120 volt supply may be utilized. Also, it will be understood that the usefulness of the control arrangement of this invention is not limited to electrically heated driers but is equally useful in association with other types of driers, for instance, driers heated by combustible gas or other heating fluid. In that event, the usual two-line circuit would suffice for the operation of the motor and signalling device, as well as for the operation of conventional solenoid valve means to control the supply of the gas or other fluid in a manner well known in the art.

With the arrangement shown in the drawing, it will be noted that, during a trap-clogging condition, the thermostatic switch will open the circuit of the signalling device and reclose the heater circuit when the drying enclosure cools off, and will again open the heater circuit and reclose the circuit of said device when said enclosure again reaches a predetermined high temperature. In this manner there is provided an intermittent signal to attract the attention of the observer. It will be understood that if, instead of this intermittent or cyclic operation, a complete shut-off of the heater and a sustained signal of the trap-clogging condition be desired, then a thermostatic switch of well known type having manual or push-button resetting means could be employed. Such a switch when moved to the position represented at "C" in the drawing, would remain in that position and, until manually released, would maintain the heater circuit open and the signalling device circuit closed.

What I claim is:

1. In a clothes dryer having a drying enclosure, the combination of an electrically operable heater for raising the temperature of said enclosure and maintaining it within a temperature range having a predetermined normal lower limit and a predetermined normal upper limit, an electrically operable signalling device for indicating the existence of a condition effecting a temperature rise beyond said normal upper limit, and means for controlling the operation of said heater and device, said means including a three-position switch and a heat sensitive element for moving said switch; said sensitive element being responsive to temperature at said normal lower limit to move said switch to a first position in which said heater is made operative and said signalling device is made inoperative, said sensitive element also being responsive to temperature at said normal upper limit to move said switch to a second position in which both said heater and device are made inoperative, and said sensitive element further being responsive to temperature rise beyond said normal upper limit to move said switch to a third position in which said heater is made inoperative and said signalling device is made operative.

2. The combination as set forth in claim 1, in which means is provided to circulate air through the mentioned drying enclosure, said means including a duct for passage of air from said enclosure, and in which a lint trap is mounted in said duct to intercept and collect lint entrained in the air flowing from said enclosure, the collecting lint tending to raise the temperature within said enclosure beyond the mentioned normal upper limit to effect movement of the mentoned switch to its mentioned third position.

References Cited in the file of this patent

UNITED STATES PATENTS

| | | |
|---|---|---|
| 2,505,041 | Gorsuch | Apr. 25, 1950 |
| 2,526,566 | Kolisch | Oct. 17, 1950 |
| 2,550,118 | Kauffman | Apr. 25, 1951 |
| 2,557,104 | Butler | Dec. 4, 1951 |
| 2,625,239 | Senne | Jan. 13, 1953 |
| 2,644,246 | Robinson | July 7, 1953 |